(12) United States Patent
Chen et al.

(10) Patent No.: US 6,222,644 B1
(45) Date of Patent: Apr. 24, 2001

(54) METHOD FOR SCANNING SMALL DOCUMENTS BY USING A CARD READER KIT

(75) Inventors: James C. Chen; Lin Sung-Hui, both of Taoyuan (TW)

(73) Assignee: Acer Cummunications and Multimedia Inc., Taoyuan (TW)

( * ) Notice: Subject to any disclaimer, the term of this patent is extended or adjusted under 35 U.S.C. 154(b) by 353 days.

(21) Appl. No.: 08/679,595

(22) Filed: Jul. 19, 1996

(51) Int. Cl.$^7$ .................................................. G03G 21/00
(52) U.S. Cl. ............................................ 358/403; 358/400
(58) Field of Search .................................. 358/400, 401, 358/403, 443, 453, 487; 382/305, 306; 355/54, 75

(56) References Cited

U.S. PATENT DOCUMENTS 5,237,156 * 8/1993 Konishi et al. ....................... 235/375
5,331,380 * 7/1994 Nasset ................................. 355/200
5,483,325 * 1/1996 Bodapati et al. .................... 355/230

* cited by examiner

Primary Examiner—Thomas D. Lee
Assistant Examiner—Stephen Brinich
(74) Attorney, Agent, or Firm—Winston Hsu

(57) ABSTRACT

The invention relates to a card reader kit for scanning a plurality of small documents by using an image scanner and a computer system, and generating a document image file for each of the small documents automatically. The card reader kit comprises a plurality of blocks for placing the small documents and the system comprises a form file which comprises the location of each block on the card reader kit. The method comprises the steps of:

(1) placing each of the small documents on one block of the card reader kit;
(2) scanning the card reader kit coupled with the small documents into the system to generate a master image file;
(3) processing the master image file by using the form file to generate a document image file for each of the small documents.

7 Claims, 4 Drawing Sheets

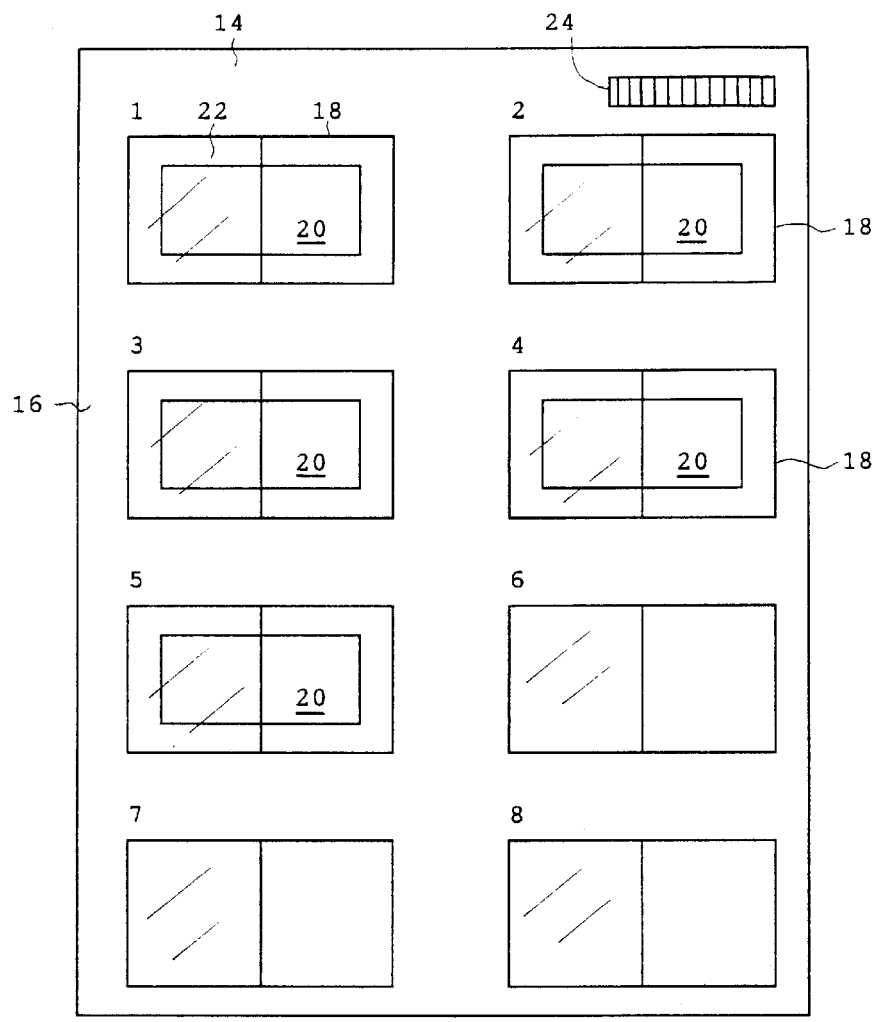

METHOD FOR SCANNING SMALL DOCUMENTS BY USING A CARD READER KIT

BACKGROUND OF THE INVENTION

1. Field of the Invention

The present invention relates to a method for scanning small documents, and more particularly, to a method for scanning small documents by using a card reader kit.

2. Description of the Prior Art

Image scanners are commonly used in office environment for scanning document images into computers. Most full-size documents are scanned in a page-by-page sequence. For scanning some small documents such as business cards, small diagrams or pictures, a user can either scan such documents in a one-by-one sequence or place multiple documents on the scanner and scan all of them into the computer simultaneously. If the user choose to scan each small document separately, it may use a lot of time if the user needs to scan a lot of documents. If the user places multiple small documents over an scanner and scan all these documents simultaneously, the image file generated by such method will have to be separated manually by using cut and paste method in order to generate image files for each small document. Such cut and paste work may also consume a lot of time and effort. It would be much helpful if multiple small documents can be scanned simultaneously and an image file for each small document can be automatically generated by the computer.

SUMMARY OF THE INVENTION

It is therefore a primary objective of the present invention to provide a new method for scanning a plurality of small documents and generating an image file for each small document automatically.

Briefly, in a preferred embodiment, the present invention discloses a method for scanning a plurality of small documents by using a data processing system comprising a computer system, an image scanner and a card reader kit. The card reader kit comprises a plurality of blocks for organizing the small documents. And the system comprises a form file which comprises the location of each of the blocks on the card reader kit. The method comprises the steps of:

(1) placing each of the small documents on one block of the card reader kit;

(2) scanning the card reader kit coupled with the small documents into the system to generate a master image file;

(3) processing the master image file by using the form file to generate a document image file for each of the small documents.

The card reader kit further comprises an identification mark which can be converted into a form ID after scanned into the system and the system further comprises an index file having at least one entry for relating the form ID of the card reader kit to the form file. The method further comprising the following steps after the master image file is generated:

(1) locating and retrieving the identification mark's image from the master image file;

(2) converting the identification mark's image into the form ID;

(3) searching the index file by using the form ID to find the form file.

It is an advantage of the present invention that it provides a new method for scanning a plurality of small documents by using a card reader kit and generating an image file for each small document automatically.

It is another advantage of the present invention that the index file and the identification mark makes it possible to design various card reader kits so that various types or combinations of small documents can be directly scanned into the system by using various card reader kits.

These and other objects and the advantages of the present invention will no doubt become obvious to those of ordinary skill in the art after having read the following detailed description of the preferred embodiment which is illustrated in the various figures and drawings.

BRIEF DESCRIPTION OF THE DRAWINGS

FIG. 2 is a top view of the card reader kit shown in FIG. 1.

FIG. 3 is a diagrammatic view which shows a form file of the card reader kit shown in FIG. 2 and an index file.

DETAILED DESCRIPTION OF THE PREFERRED EMBODIMENT

Figure 1:
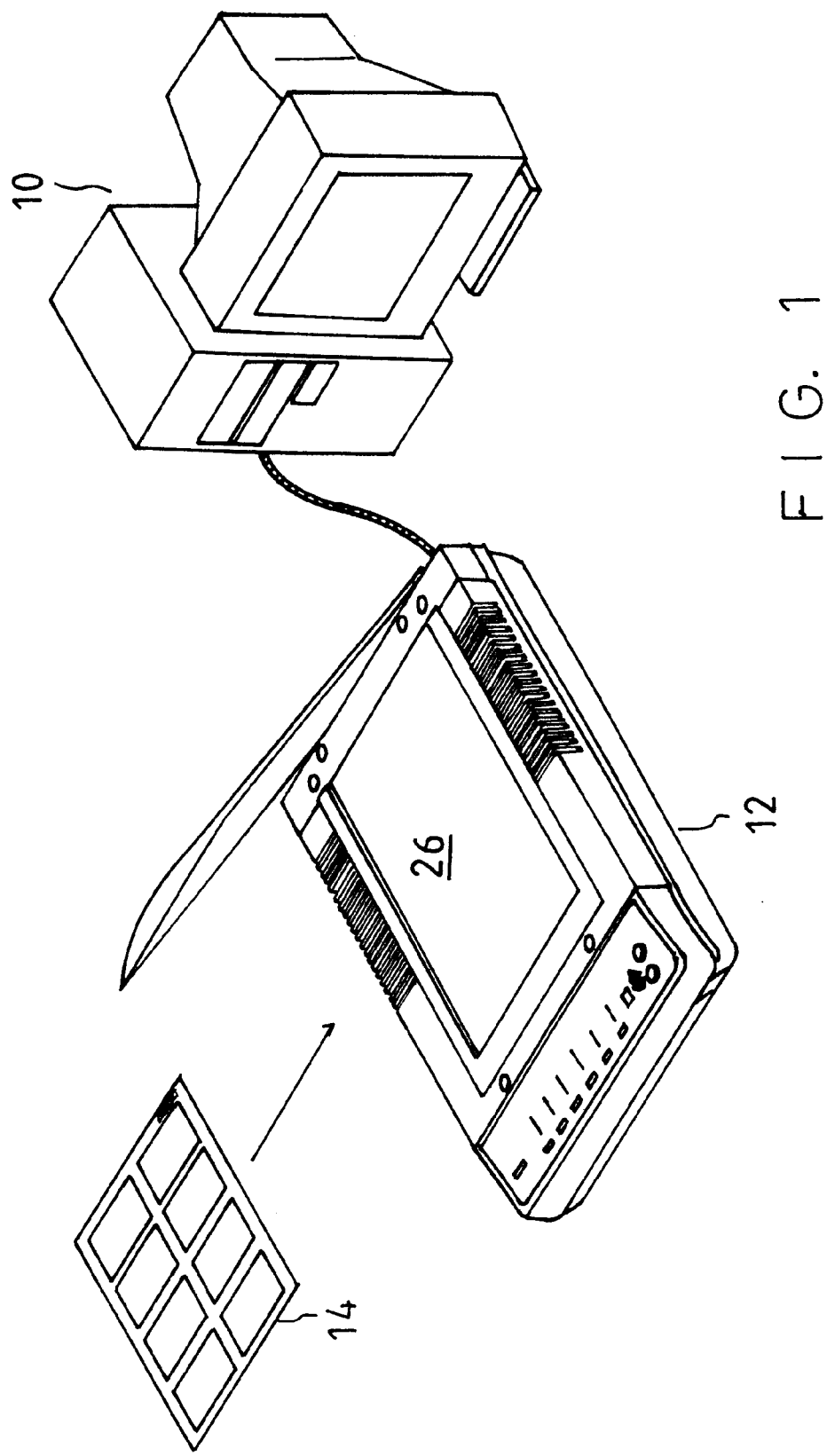
FIG. 1 is a perspective view of a computer system, an image scanner and a card reader kit to be scanned according to the present invention.

Please refer to FIGS. 1 and 2. FIG. 1 is a perspective view of a computer system 10, an image scanner 12 and a card reader kit 14 to be scanned, and FIG. 2 is a top view of the card reader kit 14 shown in FIG. 1. The card reader kit 14 comprises a plastic board 16 with a plurality of rectangular blocks 18 built in it for holding small documents 20 which are business cards. Business cards are used as an example of the small documents in FIG. 2. Other small documents such as small pictures or diagrams can also be held in the blocks 18 for scanning. Each block 18 comprises a card clamping mechanism 22 which is a transparent plastic pocket for clamping each card. The card reader kit 14 further comprises an identification mark 24 which is presented in a bar code format. The identification mark 24 is placed in a predetermined location so that it can be recognized by the system 10 after scanned by the scanner 12. After all the cards 20 to be scanned are placed in each block 18, the card reader kit 14 will be placed facing downward over the transparent top 26 of the scanner 12 for scanning.

FIG. 3 is a diagrammatic view which shows a form file 30 of the card reader kit shown in FIG. 2 and an index file 32. The form file 30 comprises a plurality of entries 34 for recording the location of each block 18 on the card reader kit 14. The form file 30 can be prepared by using several methods. A user can create the form file 30 directly by entering the locations of all the blocks 18 of the card reader kit 14 to the form file 30 according to the spec of the card reader kit 14, or he can scan the card reader kit 14 without any card 20 into the system 10 and then identifying and recording the location of each block 18 in the form file 30.

When the image of the card reader kit 14 coupled with the business cards 20 is scanned into the system 10, the form file 30 will be used to retrieve the image of each block 18 out of the card reader kit's image for further processing. The index file 32 is used for relating the identification mark 24 of the card reader kit 14 to the form file 30. The index file 32 comprises a plurality of entries 36 and each entry 36 records the form ID (identification) 37 of a card reader kit and the address 38 of its corresponding form file. The value of each form ID 37 is equivalent to the value of the identification mark of each card reader kit which is presented in a bar code format. When the image of a card reader kit is scanned into the system 10, it will first locate and retrieve the image of the identification mark and then convert it into a form ID. The form ID is then used as a key to search the index file 32 for the address of the corresponding form file for further processing.

Figure 4:
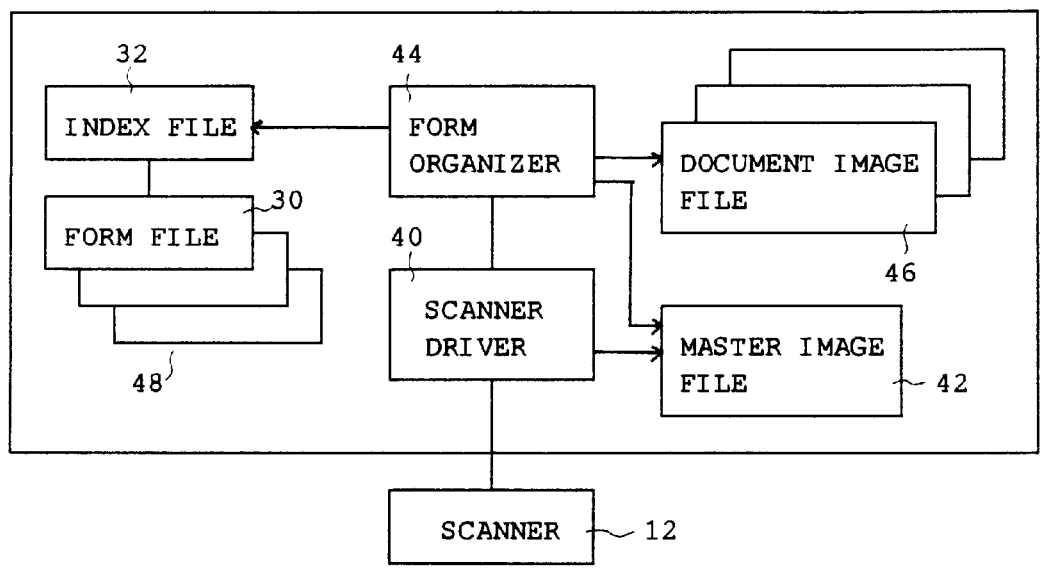
FIG. 4 is a diagrammatic view of the computer system and the image scanner which shows the programs and files used in the system for scanning a card reader kit.

FIG. 4 is a diagrammatic view of the system 10 and the scanner 12 which shows the programs and files used in the system 10 for scanning the card reader kit 14. The system 10 comprises a scanner driver 40 for driving the scanner 12. A master image file 42 is generated by the scanner driver 40 after scanned the card reader kit 14. A form organizer 44 will then process the master image file 42 to generate several document image files 46 by using the form file 30. The system 10 also comprises an index file 32 and a plurality of form files 48 in it. One of the form files 48 is the form file 30 of the card reader kit 14. The details for scanning the card reader kit 14 by using the programs and files of the system 10 and the scanner 12 is described in FIG. 5.

Figure 5:
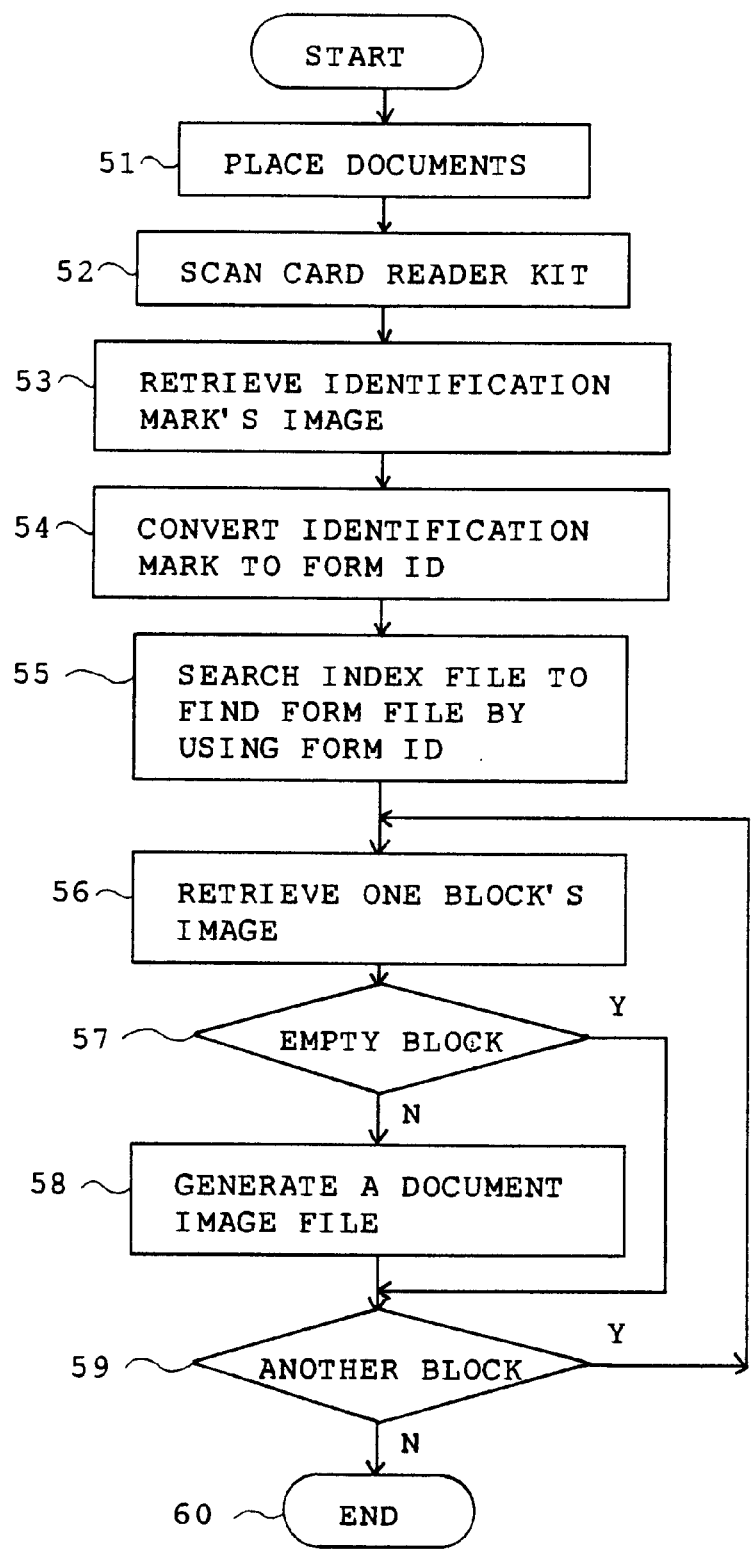
FIG. 5 is a flow chart which defines the process for scanning a card reader kit.

FIG. 5 is a flow chart which defines the process for scanning the card reader kit 14.

step 51 place each of the small documents 20 in one block 18 of the card reader kit 14;

step 52 scan the card reader kit 14 coupled with the small documents 20 into the system 10 to generate a master image file 42;

step 53 locate and retrieving the image of the identification mark 24 from the master image file 42;

step 54 convert the image of the identification mark 24 into a form ID;

step 55 search the index file 32 by using the form ID to find the address of the form file 30;

step 56 retrieve the image of one block 14 out of the master image file 42 according to the location of the block 14 stored in the form file 30;

step 57 check the retrieved image to see if it is an empty block; if yes, go to step 60;

step 58 generate a document image file 46;

step 59 check the form file 30 to see if there is another block to be scanned; go to step 57 if there is one;

step 60 finish the process.

Step 52 is executed by using the scanner driver 40 and steps 53 to 60 are executed by using the form organizer 44. The form organizer 44 obtains a form ID from the master image file 42 first in steps 53 and 54 and then use the form ID to search the index file 32 in order to locate the form file 30. After the form file 30 is found, the form organizer 44 processes the master image file 42 by using the form file 30 to generate a document image file 48 for each of the small documents 20. The image of each block 14 is retrieved from the master image file 42 and examined to see if it is an empty block or not. A document image file 46 will be created only if the image of the block is not empty. This process will be repeated until the images of all the blocks are processed.

Figure 6:
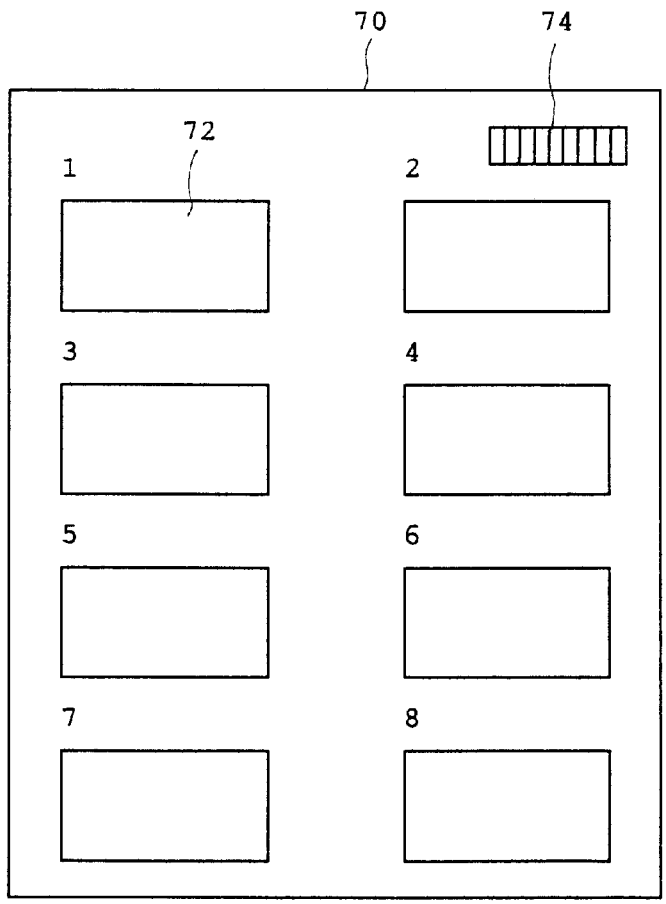
FIG. 6 is a top view of another card reader kit.

The card reader kit 14 shown in FIG. 2 is designed for scanning business cards. It can easily and conveniently hold several business cards in it for scanning. Other design such as the transparent sheet 70 shown in FIG. 6 can also be used for such purpose. FIG. 6 is a top view of the transparent sheet 70. It comprises a plurality of rectangular blocks 72 and an identification mark 74 printed on it. The transparent sheet 70 should be placed on the transparent top 26 of the scanner 12 first when it is used for scanning business cards. And then each card should be placed within the frame of one block 72 for scanning.

The above disclosure is not intended as limiting. Those skilled in the art will readily observe that numerous modifications and alterations of the device may be made while retaining the teachings of the invention. Accordingly, the above disclosure should be construed as limited only by the metes and bounds of the appended claims.

What is claimed is:

1. In a data processing system, a method for scanning a plurality of small documents by using a card reader kit which comprises a plurality of blocks for placing the small documents, said system comprising a form file which comprises a location for each of the blocks on the card reader kit, said method comprising:

(1) placing each of the small documents on one block of the card reader kit;

(2) scanning the card reader kit coupled with the small documents into the system to generate a master image file;

(3) processing the master image file by using the form file to generate a document image file for each of the small documents.

2. The method or claim 1 wherein the card reader kit further comprises an identification mark which can be converted into a form ID after scanned into the system and the system further comprises an index file having at least one entry for relating the form ID of the card reader kit to the form file, said method further comprising the following steps after the master image file is generated:

(1) locating and retrieving the identification mark from the master image file;

(2) converting the image of the identification mark into the form ID;

(3) searching the index file by using the form ID to find the form file.

3. The method of claim 2 wherein the identification mark is presented in a bar code format.

4. The method of claim 1 wherein the card reader kit comprises a plastic board with a plurality of rectangular blocks built in it for placing the small documents.

5. The method of claim 4 wherein each of the blocks comprises a card clamping mechanism for clamping the small document.

6. The method of claim 5 wherein the card clamping mechanism is a transparent pocket for clamping the edge of a small document.

7. The method of claim 1 wherein the card reader kit is a transparent sheet with a plurality of rectangular blocks printed on it and each of the small documents is placed within one block of the transparent sheet for scanning.

* * * * *